Dec. 4, 1928.　　　　W. B. CLARKSON　　　　1,694,250
ELECTROMAGNETIC DEVICE
Filed Oct. 19, 1925

Inventor:
William B. Clarkson,
by
His Attorney.

Patented Dec. 4, 1928.

1,694,250

UNITED STATES PATENT OFFICE.

WILLIAM B. CLARKSON, OF SCHENECTADY, NEW YORK, ASSIGNOR TO GENERAL ELECTRIC COMPANY, A CORPORATION OF NEW YORK.

ELECTROMAGNETIC DEVICE.

Application filed October 19, 1925. Serial No. 63,464.

My invention relates to improvements in electromagnetic devices, and in particular to electromagnetic controlling devices for electric motors for causing the control of the motor to be in accordance with the rate of change of a changing condition of the motor or of the motor circuit, such as the rate of change of the counter electro-motive force of the motor or the rate of change of the current taken by the motor.

The object of the invention is to provide an improved device of the character set forth which, when suitably connected with a motor circuit, will function as an electromagnetic switch having inherently the desired characteristics for controlling the motor in accordance with the rate of change of a suitable changing condition of the motor or the motor circuit, the said device being of such a nature that it will adapt itself to existing systems of motor control without material changes in the systems to accommodate my improved controlling device.

In carrying the invention into effect in the form which I now regard as the preferred form thereof, I provide an electromagnetic switch with a non-magnetic current conductive element within which a local current is set up by the flux set up by the winding of an electromagnetic element, the said elements being mounted for relative movement in response to the rate of change of the current in said winding. A switch member is connected to the element which moves and this switch member is adapted to control motor controlling devices. The winding of the electromagnetic element is arranged to be connected to the circuit of an electric motor so as to be energized in accordance with a suitable changing condition such as the change of the counter electromotive force of the motor or the change in the current taken by the motor. The switch member is preferably biased to one position and held in a second position by reason of the cooperation of the fluxes of the said elements while the rate of change of the changing condition of the motor or the motor circuit is above a predetermined value, and the switch member is released to move to its biased position when the rate of change of said condition is reduced.

Figure 1:
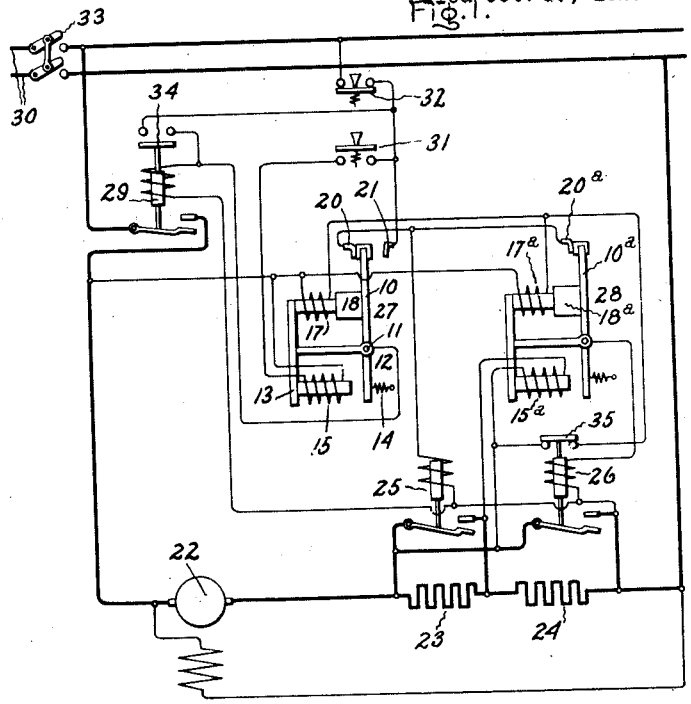
Figure 2:
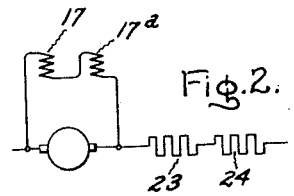
Figure 3:
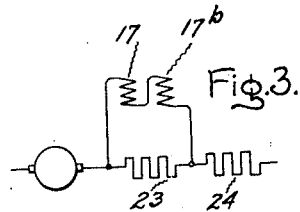
Figure 4:
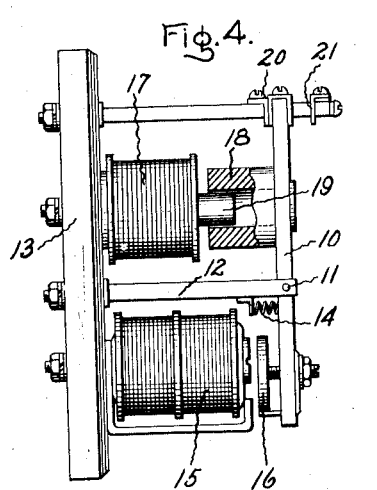
Figure 5:
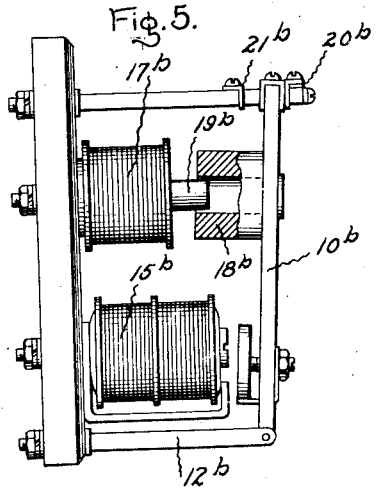

For a better understanding of the invention, reference is had to the accompanying drawing in which Fig. 1 is a motor control system employing the electromagnetic controlling devices of the present invention, Figs. 2 and 3 are details showing modifications of the manner of connecting the windings of the electromagnetic elements of my improved devices with the circuit of an electric motor, Fig. 4 is a perspective view showing the details of construction of the preferred form of the electromagnetic device of the invention, and Fig. 5 is a similar view of a modified form of the device.

It is believed that an easy understanding of the invention will be had by first considering the electromagnetic switch shown in Fig. 4. In this arrangement, the switch member 10 of non-magnetic material, such as brass, is pivotally mounted at 11 in the support 12 secured to the base 13 of insulating material. The switch member 10 is biased to the position shown by means of the spring 14, and the switch member is operated out of the biased position to another position by means of the electromagnet 15 which has an armature 16 secured to the lower end of the switch member. The electromagnetic controlling element 17 and the current conducting non-magnetic element 18 are provided for regulating the return of the switch member to the biased position in accordance with the rate of change of the current in the winding of the electromagnet 17. This electromagnet has a core 19 of magnetic material which is secured to the base 13 as indicated. The current conducting element 18 is preferably a single turn winding, preferably of copper, short-circuited upon itself by reason of the fact that this element is preferably in the form of a cylinder, as indicated. This cylinder nests with the core 19 of the electromagnet 17.

When the switch member 10 is moved out of engagement with the contact 20 and into engagement with the contact 21 by means of the electromagnet 15, if the electromagnet 15 is then deenergized and the winding of the electromagnet 17 is energized by a rapidly increasing current, the switch member will be held in engagement with the contact 21 by reason of the cooperation of the flux set up by the element 18 cooperating with the flux set up by the winding of the electromagnet 17. When the rate of increase of the current in the winding of the electromagnet 17 is above a predetermined value, by reason of the fact that the element 18 is disposed in the magnetic field of the electromagnet 17, a current will be induced in the element 18 which will set up a flux in such a direction that there will be a repulsive effect between the electromagnetic element 17 and the nonmagnetic element 18. This repulsive effect will operate against the biasing spring 14 and serve to hold the switch member in engagement with the contact 21 as long as the rate of increase of the current in the winding of the electromagnet is above the predetermined value. When the rate of increase of said current is less than the predetermined value and approaches a substantially constant value, the repulsive effect of the said fluxes will diminish to such a value that the effect of the spring 14 will predominate and move the switch member out of engagement with the contact 21 into engagement with the contact 20. This operation of the switch member will be substantially independent of the momentary value of the energizing current of the winding of electromagnet 17.

In employing the electromagnetic switch of the invention in a system of motor control in order to regulate the acceleration of the motor in accordance with the rate of change of a changing condition of the motor or the motor circuit, I connect the winding of the electromagnetic element 17 so as to be energized by an increasing current as the motor accelerates, as for instance by connecting this winding so as to be energized in accordance with the counter electromotive force of the controlled motor. In Fig. 1 I have shown in very simple diagram an arrangement which employs electromagnetic switches as previously explained in connection with Fig. 4, the switches operating as relays which control resistor contactors in the motor circuit so as to regulate the short-circuiting of the resistance in the armature circuit of the controlled motor in accordance with the rate of change of the counter electromotive force of the motor.

Referring to Fig. 1, the controlled motor 22 has the resistors 23 and 24 included in the armature circuit thereof for the usual purpose. The resistor 23 is shunted by means of the contactor 25 and the resistor 24 is shunted by means of the contactor 26. The contactor 25 is connected so as to be under the control of the relay 27 and the contactor 26 is connected so as to be under the control of the relay 28. These relays 27 and 28 are of the construction previously described in connection with Fig. 4. The line contactor 29 is provided for connecting the motor to the supply circuit 30, and the start push button 31 and stop push button 32 are provided for the usual purposes.

As thus constructed and arranged and with the parts in their respective positions as indicated in the drawing, the operation of the system indicated in Fig. 1 is as follows: The disconnecting switch 33 will first be closed and then the start push button 31 closed. The closing of the start push button completes the energizing circuit for the winding of the electromagnet 15 of the relay 27, and the switch member 10 of this relay is moved clockwise about its pivotal support so that the contact at the upper end thereof is brought into engagement with the stationary contact 21. This completes an energizing circuit for the winding of the line contactor 29, the circuit being through the stop push button 32, contact 21 and switch member 10 of relay 27, winding of contactor 29 to the other supply conductor. The closing of the line contactor 20 not only connects the motor to the supply circuit, but also shunts the winding of the electromagnet 15 of relay 27 so that the return of the switch member 10 of this relay from engagement with the contact 21 to engagement with the contact 20 is now under the control of the electromagnetic element 17 and the non-magnetic winding 18.

It will be noticed that the closing of the motor circuit effects the energization of the winding of electromagnet 15ª of relay 28 because of the fact that this winding is connected across the resistor 23. The switch member 10ª of relay 28 will also be operated so as to break engagement with its stationary contact 20ª when the motor circuit is closed by the closing of the line contactor 29. The line contactor 29 in closing establishes a maintaining circuit for its winding through the auxiliary switch 34 so that the push button 31 may be released and the line contactor nevertheless remain closed. It will be noticed that the winding of the electromagnetic element 17 of relay 27 and the winding of the electromagnetic element 17ª of relay 28 are connected in multiple relation in a local circuit about the armature of the motor 22, the circuit being through the auxiliary switch 35 of the resistor contactor 26.

As the motor increases in speed, the voltage applied to the windings of the electromagnetic elements 17 and 17ª will increase, and a current will be induced in the element 18 of the relay 27 and the element 18ª of relay 28. The connections are such that the relay 27 is required to first operate and the relay 28 is prevented from operating to energize the resistor contactor 26 until after the relay 27 has operated to energize the resistor contactor 25. The rate of increase of the counter electromotive force of the motor will be comparatively high initially and will taper off and approach a constant value as the motor accelerates to the speed determined by the value of the resistors 23 and 24 included in the armature circuit of the motor.

As long as the rate of increase of the counter electromotive force is in excess of a predetermined value, the previously referred to repulsive action between the fluxes of the electromagnetic element 17 and the non-magnetic element 18 will be of such a value that the switch member 10 of relay 27 will be held from operating to make engagement with the contact 20. As the counter electromotive force of the motor approaches a steady value, this repulsive action diminishes and finally the switch member 10 is operated in accordance with its bias to break engagement with the contact 21 and make engagement with the contact 20. The breaking of engagement with the contact 21 does not produce any effect, since as before explained, the line contactor 29 established a maintaining circuit for itself in closing. When the switch member 10 makes engagement with the contact 20, the winding of resistor contactor 25 will be energized, the circuit being through the stop push button 32, the auxiliary switch 34 of line contactor 29, switch member 10 and contact 20 of relay 27, winding of contactor 25 to the other supply conductor.

The closing of contactor 25 will shunt the armature resistor 23 and also the winding of the electromagnet 15$^a$ of relay 28 so that this relay is now placed under the entire control of the winding of the electromagnetic element 17$^a$. The short-circuiting of the resistor 23 will cause the motor speed to increase and effect an increase in the counter electromotive force of the motor. This increasing counter electromotive force will be the controlling influence for the relay 28 and as long as the rate of increase is above the predetermined value, the relay 28 will not be permitted to make engagement with the contact 20$^a$ thereof. However, as the motor speed increases and approaches a constant value, the repulsive effect between the flux set up by the winding of the electromagnetic element 17$^a$ and the flux set up by the current in the single turn winding 18$^a$, will be insufficient to overcome the bias of the relay switch member and this switch member will be permitted to make engagement with the contact 20$^a$.

The winding of the resistor contactor 26 will be energized through a circuit including the stop push button 32, auxiliary switch 34 of line contactor 29, switch member 10 and contact 20 of relay 27, contact 20$^a$ and switch member 10$^a$ of relay 28, through the winding of the contactor 26 to the other supply conductor. The resistor contactor 26 will thus be energized to close and shunt the armature resistor 24. This contactor in closing will open its auxiliary switch 35, thereby opening the circuit for the windings of the electromagnetic elements 17 and 17$^a$ of the relays 27 and 28. This will produce no effect since the switch members of these relays are biased to their respective positions as indicated in Fig. 1. In order to stop the equipment at any time, the stop push button 32 will be depressed, thereby effecting the opening of the line contactor and the resistor contactors and causing the various parts of the system to resume their positions indicated in Fig. 1.

In Fig. 1 I have indicated a system in which the windings of the electromagnetic elements 17 and 17$^a$ of the relays 27 and 28 are connected in multiple relation with each other about the armature of the electric motor and in Fig. 2 I have indicated that this multiple connection of the windings of the relay is not essential since these windings may be connected in series relation as indicated in Fig. 2.

The electromagnetic device of the invention is not necessarily limited to an arrangement for controlling the acceleration of an electric motor in accordance with the rate of change of the counter electromotive force of the motor and in Fig. 3 I have indicated that the windings of the electromagnetic elements 17 and 17$^a$ may be connected so as to be energized in accordance with the current taken by the motor or in accordance with the voltage drop across a resistor in the motor armature circuit. However, the motor current is a gradually decreasing value as the motor accelerates and a minor modification of the relay is desirable in order to take care of this difference in the controlling function.

In Fig. 5 I have indicated the construction of a relay which is particularly designed for operation on a decreasing value of energization of the winding of the electromagnetic element 17$^b$. In this arrangement the switch member 10$^b$ is pivotally mounted at its lower end in the support 12$^b$ and switch member is biased into engagement with the contact 20$^b$. The electromagnet 15$^b$ is provided for a similar purpose to that of the electromagnet 15 of the arrangement of Fig. 4, namely to move the switch member of the device out of its biased position and into a position so as to be under the control of the electromagnetic element 17$^b$. This switch member 10$^b$ is also of non-magnetic material, and the non-magnetic current conducting element or winding 18$^b$ is disposed with relation to the core 19$^b$ so as to have a local induced current set up therein by the winding of the electromagnetic element 17$^b$.

By reason of the fact that if the winding of the electromagnetic element 17$^b$ is connected in the manner indicated in Fig. 3, it will have applied thereto a gradually decreasing voltage as the motor accelerates, the flux set up in the non-magnetic element 18$^b$ will be in such a direction as to produce an attractive effect with relation to the flux set up by the electromagnetic element 17$^b$. The attractive effect of these two fluxes will cause the switch member 10$^b$ to be held in engagement with the switch member 21$^b$ as long as the rate of decrease of the energizing current of the winding of the electromagnetic element 17$^b$ is above a predetermined value. However, when the rate of decrease of this energizing current is less than a certain value by reason of the acceleration of the motor, the attractive effect of the two said fluxes will be insufficient to hold the relay switch member against its bias to make engagement with the contact 20ᵇ. When connection is made with the contact 20ᵇ, a resistor contactor in the motor circuit will be energized to close in the manner set forth in connection with the arrangement of Fig. 1.

It is believed that with the explanation of the construction and the principles of operation of my invention which have been previously given in connection with Figs. 1 and 4, those skilled in the art will readily understand the minor modifications in the connections necessary to employ the electromagnetic device of Fig. 5 in a system such as indicated very briefly in Fig. 3.

One of the advantages of the electromagnetic device of my invention is that it is comparatively simple and inexpensive to manufacture and furthermore it employs parts of existing and developed devices and fits into previously developed systems of motor control, with comparatively only minor changes in the system to accommodate the electromagnetic device of the invention. Furthermore, it will be seen that all of the well known advantages of rate of change control for the acceleration of an electric motor are secured. The principal of these advantages is that an acceleration step will be taken regardless of the particular value of current taken by the motor in case the counter electromotive force of the motor has approached a substantially constant value or the current taken by the motor has reduced to a substantially constant value.

What I claim as new and desire to secure by Letters Patent of the United States is:—

1. An electromagnetic controlling device for direct current electric motors comprising an electromagnetic element having a winding for connection with the motor circuit to be energized in accordance with a changing condition of said circuit, a non-magnetic current conducting element inductively related to said electromagnetic element to have set up therein an induced current by the winding of said electromagnetic element, one of said elements being mounted for a movement with respect to the other of said elements, and a non-magnetic movable member biased to one position and connected with the said movable element which is regulated by the repulsive effect of the fluxes set up in said winding and said current conducting element in accordance with the rate of change of the current in said winding to be held in a second position thereby against said bias substantially independently of the momentary value of the energizing current of said winding while the rate of change of the current in said winding is above a predetermined value and released thereby to move to the biased position thereof substantially independently of the momentary value of the energizing current of said winding when the rate of change of said current reduces.

2. An electromagnetic controlling device for direct current electric motors comprising a non-magnetic movable member, means for biasing said member to one position, an electromagnet having a winding for connection with the motor circuit to be energized in accordance with a changing condition of said circuit for controlling the movements of said member, a non-magnetic current conducting element carried by said member and inductively related to said winding to have set up an induced current therein by said winding, the flux set up by the induced current in said element cooperating with the flux set up by said winding to provide a repulsive effect which holds the said member in a second position against the action of said biasing means while the rate of change of the current in said winding is above a predetermined value substantially independently of the momentary value of the energizing current of said winding and then permits the member to move to said biased position substantially independently of the momentary value of the energizing current of said winding when the current in said winding becomes substantially constant.

3. An electromagnetic controlling device for electric motors comprising a non-magnetic switch member biased to one position and movable to a second position, an electromagnet having a winding arranged to be connected to the circuit of the controlled motor to be energized in accordance with the rate of change of a changing condition of said circuit, a closed circuit non-magnetic current conductive element carried by said member and inductively related to said winding to have set up an induced current therein by said winding, and a second electromagnet for operating said member to said second position to place the member under the control of said winding, the flux set up by said winding in said element cooperating with the flux set up by said winding to hold said member in said second position while the rate of change of the current in said winding is above a predetermined value.

In witness whereof I have hereunto set my hand this 16th day of October, 1925.

WILLIAM B. CLARKSON.